2,890,198

MODIFIED ARYLOXY ACID URETHANE

Alfred W. Breiner, Racine, Wis., assignor to S. C. Johnson & Son, Inc., Racine, Wis.

No Drawing. Application August 27, 1956
Serial No. 606,227

6 Claims. (Cl. 260—45.4)

The invention relates to new synthetic resins which can be formulated to give compositions possessing superior properties desirable in protective coatings, adhesives, moldings, and cellular structures. More particularly, it relates to the reaction products of aryloxy acids and isocyanates modified with compounds containing active hydrogen.

An object of this invention is the formulation of admixtures of the aryloxy acids, the isocyanates, and modifiers containing active hydrogen atoms which on further reaction form insoluble, infusible compositions and products.

Another object of this invention is the formulation of aryloxy acid-isocyanate compositions modified with compounds containing active hydrogen atoms to give hard, extremely tough products possessing good chemical and water resistance.

Another object of this invention is the formulation of aryloxy acid-isocyanate compositions modified with compounds containing active hydrogen atoms to give low density, tough, rigid, cellular products.

A further object of this invention is the formulation of aryloxy acid-isocyanate compositions modified with compounds containing active hydrogen atoms to give flexible, tough, cellular products possessing good chemical and water resistance.

Other objects of the invention will appear from the following more detailed description with particular reference to the specific illustrative examples.

The resinous aryloxy acids used in this invention are prepared, as described in the copending Greenlee application, Serial No. 403,645, filed January 12, 1954, by reacting in the presence of alkali a dihydric phenol with a coupling agent having two functional groups which readily form ether linkages with phenolic hydroxyl groups. The amount of dihydric phenol used is in excess of the equivalent amount of the coupling agent so as to provide unreacted phenolic hydroxyl groups in the product. A part of the unreacted phenolic hydroxyl groups are then etherified in the presence of alkali with a substituted carboxylic acid. The final product is thus an aryloxy acid containing a plurality of ether oxygens and conforming to the general formula:

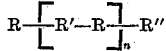

in which R is the residue of a dihydric phenol, R' represents the residue of an aliphatic coupling agent, R'' constitutes the carboxyl-supplying radical, and $n$ is an integer of from 1 to 10.

The dihydric phenols suitable for use in making the aryloxy acids may be mononuclear, such as resorcinol, hydroquinone, catechol, etc., or polynuclear, such as p,p'-dihydroxy benzophenone, p,p'-dihydroxy diphenyl, p,p'-dihydroxy dibenzyl, dihydroxy anthracenes, dihydroxy naphthalenes, bisphenols, wherein the aromatic nuclei are joined by an alkyl group having from 1 to 10 carbon atoms, etc. Particularly advantageous in making the aryloxy acids described herein are the bisphenols.

The coupling agents advantageously used in building up the molecular structure desired for the resinous aryloxy monoacids are bifunctional in their reactions with the dihydric phenols in the presence of alkali. Epichlorohydrin is bifunctional in such reactions in that the epoxide group and the chloride group each react with a phenolic hydroxyl group in the presence of alkali forming ether linkages between the epichlorohydrin residue and the dihydric phenol residue. Epihalohydrins other than epichlorohydrin, such as epibromohydrin and those structures in which one of the carbon atoms is replaced by an ether oxygen, such as 2,3-epoxypropyl-2'-hydroxy-3'-chloropropyl ether, may be used. The epihalohydrins suitable for use as coupling agents should be based on an aliphatic structure containing from 3 to 10 carbon atoms. Similarly, diepoxides containing from 4 to 10 carbon atoms, such as 1,2-epoxy-3,4-epoxybutane, or those in which one of the carbon atoms is replaced by an ether oxygen, such as bis(2,3-epoxypropyl)ether, may be used. Epoxides referred to herein are limited to those in which the oxygen bridges adjacent carbon atoms, also referred to as ethylene oxides.

The coupling agent may also be an aliphatic dihalide since these materials also react with phenolic hydroxyl groups to form ethers. Exemplary halides are 1,2-dichloroethane, 1,3-dichloropropane, 1,2-dibromoethane, 1,3-dibromopropane, 1,10-dichlorodecane, and the dihalides of corresponding olefins. The ethers of the dihalides may also be used in this capacity. Such dihalo ethers are dichloroethylether, dichloroisopropyl ether, dichloroethyl formal, and triglycol dichlorides. Particularly advantageous as coupling agents are the epihalohydrins and diepoxides due to the increased functionality imparted, while the dihaloethers are excellent for imparting flexibility to the aryloxy acid.

The substituted carboxylic acids suitable for use in the preparation of the resinous aryloxy monoacids are those which contain up to about 8 carbon atoms and a single functional group which is capable of reacting with phenolic hydroxyl groups to form an ether. Exemplary acids are the monohalo acids such as chloroacetic acid, 2-chlorocaprylic acid, 5-bromovaleric acid, etc.

The successive reactions leading to a typical aryloxy acid prepared from p,p'-isopropylidenediphenol, epichlorohydrin, and chloroacetic acid are as follows:

*1st step*

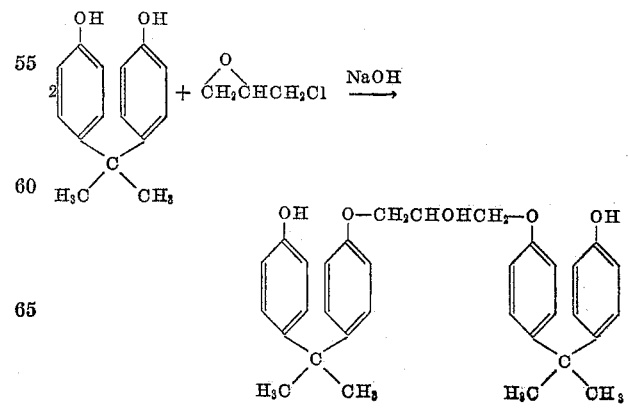

2nd step

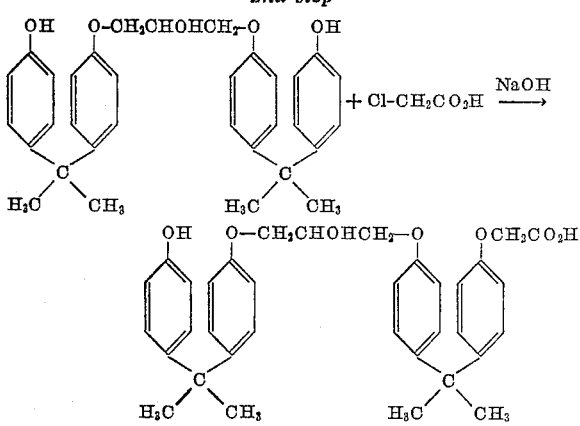

The reaction of 3 mols of p,p'-isopropylidenediphenol with 2 mols of bis(beta-chloroethyl)ether and 1 mol of chloroacetic acid would be required to give the following structure:

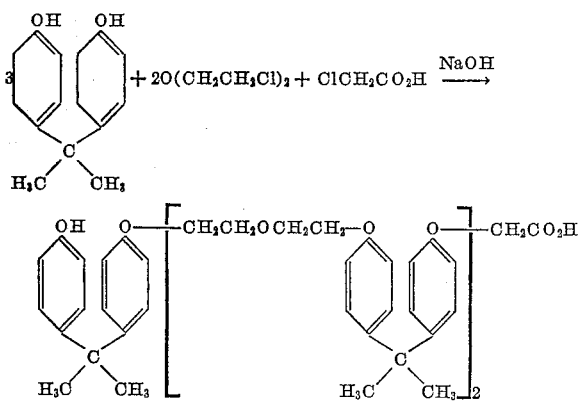

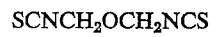

It is understood that, in the illustrative reactions given above, the desired products may be obtained in predominant amounts by properly adjusting the molar proportions of materials and the reaction conditions, but the formation of products by side reactions cannot be avoided in all cases. In the preparation of the resinous monoacids, it has been found that the side reaction products are usually not present to such a degree as to be detrimental to the properties of the final urethane composition. Where side products are found to be present to an appreciable extent, it is possible to separate the same in the course of preparing the resinous acid. Such a separation is illustrated in Example II which involves the removal of the unreacted p,p'-isopropylidenediphenol after its reaction with epichlorohydrin and before the addition of chloroacetic acid to form the final aryloxy monoacids.

It will be noted that where the aliphatic coupling agent contains alcoholic hydroxyl groups, e. g. 1,3-dichloropropanol-2, and in cases where at least one of the coupling functions is an epoxide group, as in epichlorohydrin, the resinous aryloxy acid will contain one or more alcoholic hydroxyl groups per molecule in addition to the phenolic hydroxyl group and the carboxyl group. With other coupling agents, such as bis(2-chloroethyl)-ether and 1,4-dichlorobutane, the functional groups present in the final structure are primarily phenolic hydroxyl groups and carboxyl groups. In the latter instance, there would be minor portions of alcoholic hydroxyl groups from the side reaction of hydrolysis of some alkyl halide. The method used for determining the relative portions of alcoholic and phenolic hydroxyl groups in the products containing both functions is described in "Quantitative Organic Analysis Via Functional Groups" by Sidney Siggia, pp. 4–8, published by John Wiley & Sons, Inc., New York, New York (1949).

The isocyanates used for reaction with the resinous aryloxy acids are compounds with the general formula R—$(NCX)_z$, where X may be oxygen or sulfur, z an integer of one or more, and R an organic radical. These isocyanates, therefore, may be either aromatic or aliphatic, or mixed aromatic-aliphatic products. Although it is necessary to have more than 50% of z in these reactions equal to at least two to promote polymerization, mono-functional compounds are often desirable to modify the product. This is especially true in compositions having a high degree of cross-linking and in such a manner limiting the flexibility or causing premature gelation. The mono-isocyanates in such instances would serve to decrease the degree of cross-linking and, thereby, reduce the possibility of gelation and also give a more flexible film.

Preferred isocyanates for use in this invention are toluene 2,4 diisocyanate, toluene 2,6 diisocyanate, methylene bis(4-phenyl-isocyanate), 3,3'bitoluene 4,4'diisocyanate, hexamethylene-diisocyanate, and octyldecylisocyanate. This preference is based on the commercial availability of such compounds. However, any compound of the general formula R—$(NCX)z$, as described above, may be used. This invention thus includes the use of ethylene diisocyanate, trimethylene diisocyanate, tetramethylene diisocyanate, decamethylene diisocyanate, heptylidene diisocyanate, and the corresponding diisothiocyanates; cycloalkylene diisocyanates and diisothiocyanates, e.g. cyclopentylene diisocyanate, cyclohexylene diisocyanate; aromatic diisocyanates and diisothiocyanates, e.g. m-phenylene diisocyanate, naphthalene diisocyanate, and diphenyl-4,4'-diisocyanate; aliphatic-aromatic diisocyanates and diisothiocyanates, e.g. xylene-1,4-diisocyanate and 4,4'-diphenylenemethane diisocyanate; heterocyclic diisocyanates and diisothiocyanates, such as $$SCNCH_2OCH_2NCS$$

and $SCN(CH_2)_3—S—(CH_2)_3NCS$; the isocyanates and isothiocyanates containing more than two functional groups, e.g. benzene 1,2,4-triisothiocyanate, 1,2,2-triisocyanatobutane, toluene triisocyanate; and as modifiers, the monoisocyanates and monothioisocyanates, e.g. octylisocyanate and octadecylisocyanate.

The modifiers containing active hydrogen, as expressed herein, are compounds containing at least two hydrogens per molecule reactive with an isocyanate. This includes therefore, polyesters, polyhydric alcohols and phenols, diamines, diamides, dicarboxylic acids, water, and any of the above compounds in which at least one oxygen atom has been replaced by sulfur. Exemplary thio compounds would be the thiopolyesters, mercaptans, and the thioacids.

The types of compounds enumerated above, when used as modifiers, contribute varying and unique effects to the aryloxy acid-isocyanate compositions. Some of the desirable properties imparted are increased flexibility, increased chemical and water resistance, increased hardness and toughness, improved clarity, and acceleration of the reaction. Since some of these compounds are similar in chemical structure and in the properties contributed to the composition, they have been grouped in classes. Such classes are: (1) the polyesters, (2) the polyhyric alcohols and phenols, (3) the diamines and diamides, (4) the dicarboxylic acids, and (5) the miscellaneous sulfur-containing compounds. It is to be understood, however, that modifiers from two or more groups may be employed in the same composition to produce especially desirable features, such as very rapid cure or increased flexibility.

The polyesters have been found to be particularly valuable ingredients when used in conjunction with aryloxy acids in urethane preparations. The linear character of the polyesters and the combination of the cyclic and aliphatic character of the aryloxy acid contribute excellent properties to the resinous foams and protective coating films. It is possible to prepare foamed structures which range from low density rigid foams to low density flexible foams and to vary the density from low to medium to high density flexible foams simply by increasing the ratio of polyester to aryloxy acid. It is to be emphasized that no external foaming agent is essential in these preparations. The foaming medium is contributed by the aryloxy acid. The polyesters have also been found to impart such advantageous properties as increased flexibility and improved clarity to protective coating finishes.

The polyesters which are suitable as modifiers are compositions terminated with unreacted hydroxyl or carboxyl groups. Polyesters with terminal hydroxyl groups are usually preferred. These polyesters may be prepared by using an excess of polyhydric alcohol to obtain terminal hydroxyl groups or by using an excess dicarboxylic acid to obtain terminal carboxyl groups or they may be formulated to leave both terminal hydroxyl and carboxyl groups on the same molecule. There are a number of such polyesters available commercially filling this description, such as the Multron series marketed by Mobay Chemical Company. Such polyesters have a hydroxyl value ranging from 70–1000 and an acid value from 0–80. Typical polyesters are the reaction products of glycols with aliphatic dicarboxylic acids and the alkyd type polyester. Aliphatic dicarboxylic acids which can be used are succinic, adipic, maleic, sebacic, azelaic, fumaric, and dimerized acids, such as emery dimer fatty acids. The alcohols are the difunctional glycols which include ethylene glycol, diethylene glycol, triethylene glycol, etc., and the polyfunctional alcohols such as pentaerythritol, dipentaerythritol, tripentaerythritol, sorbitol, mannitol glycerine, trimethanol propane, and triethanol propane, the ratio of acids and alcohols being such that the required residual hydroxyl or carboxyl groups are retained.

Polyhydric alcohols and phenols can also be used advantageously in conjunction with the resinous aryloxy acid-isocyanate compositions. These compounds as modifiers impart such characteristics as increased toughness, increased chemical and water resistance, increased rigidity, and increased flexibility depending on the choice of hydroxyl compound and the desired utility. For example, in protective coating finishes, diethylene glycol will impart added flexibility as well as improved water resistance, while in resinous foams, the bisphenols will impart added rigidity, whereas long chained linear compounds, such as Carbowax 6000 (a polyethylene glycol manufactured by Carbide and Carbon) will contribute a soft, smooth texture and thereby improve the flexibility. The rigidity contributed by the bisphenols is probably due to their cyclic structure as well as the added symmetry. Also of particular importance are the epon resins marketed commercially by the Shell Chemical Company.

The amines as modifiers have proven to be particularly advantageous in accelerating the reaction as well as increasing flexibility. The amides tend to impart rigidity to the films and foams. The amines and amides contemplated here vary widely in their properties, for example in the case of the amides, from the flexible, linear polymeric amides to such simple compounds as urea and toluene sulfonamide, and in the case of the amines from the 18 carbon amines derived from vegetable oils to the simpler products, such as aniline and ethylene diamine. These compounds are also useful in imparting increased chemical and water resistance.

The dicarboxylic acids as modifiers can be used to increase the foaming action, i.e. the carboxyl group reacts with the isocyanate group to liberate $CO_2$ which acts as a foaming agent, and in the case of linear acids, such as adipic, impart flexibility, or when aromatic dibasic acids are used, to impart rigidity. The dicarboxylic acids also tend to improve the water resistance of films, probably due to their hydrophilic character.

Another class of modifiers which have been found useful in these aryloxy-isocyanate compositions are the thio compounds. These compounds, depending on the choice, will impart flexibility, increase the water resistance, and contribute to the smoothness of flow and spread. Of particular importance are the thiokol resins which are essentially the reaction products of alkali polysulfides with aliphatic dihalides prepared so as to have some unreacted mercaptan groups. These products are, in general, of relatively soft texture but when used in conjunction with the aryloxy acids, in urethane formation, form smooth, tough, flexible products. Other sulfur compounds, such as the simple mercaptans may be used to impart toughness as well as improved chemical and water resistance.

It is well known in the art that a common characteristic of isocyanates is their reaction with compounds containing active hydrogen atoms. Diisocyanates as a class, because of their difunctionality, undergo reactions which lead to the formation of polymeric substances. In this respect they differ from the monoisocyanates which form only simple chemical entities. Their reaction with compounds containing active hydrogen atoms usually takes place quite readily at room temperature or with only moderate heating and usually without catalyst, however, most reactions are greatly accelerated by small amounts of basic catalysts. The tertiary amines are the preferred catalysts. In addition to their ability to form polymers, diisocyanates will liberate $CO_2$ when reacted with water or a compound containing a carboxyl group, thus providing a convenient foaming agent.

It is apparent, therefore, that a polymeric system can be formed with diisocyanates and any compound containing two or more active hydrogens per molecule and, also, that a foamed structure can be obtained if water or a carboxyl group is present.

Upon inspection of the aryloxy acids, as herein described, it is readily seen that there are at least two functional groups per molecule reactive with the isocyanates. Since one of these reactive groups is a carboxyl group, a ready means of foaming is available. Therefore, because of the combination of cyclic and aliphatic character, as well as the desirable combination of functional groups, these aryloxy acids have excellent utility in the formation of protective coatings and cellular structures when used in conjunction with the isocyanates. These compositions have also been found to be compatible with a great many organic compounds. These organic compounds have been found to contribute to a great many desirable characteristics when used to modify the aryloxy acid isocyanate compositions. The reactions of the chemical functional groups of the compounds employed herein with the isocyanates are illustrated as follows:

ROH+R′NCO→R′NHCOOR
hydroxyl group

RCOOH+R′NCO→R′NHCOOCOR→R′NHCOR+CO₂
carboxyl group

RNH₂+R′NCO→R′NHCONHR
primary amine

RCONH₂+R′NCO→R′NHCONHCOR
amide

These reactions have been illustrated using monofunctional compounds for convenience, but it is to be understood that polyfunctional compounds react in the same manner to form polymeric systems. It is also true that sulfur may be substituted for one or more of the oxygens in the above compounds.

Compositions prepared from the aryloxy acids and the isocyanates, modified with compounds containing active hydrogen atoms, have been found to have exceptional utility for protective coatings, adhesives, molding compounds, and foamed resin structures. Protective coatings have been prepared having excellent properties such as water-white clarity, extreme toughness and flexibility, and excellent chemical and water resistance. A film prepared from a composition of this invention has been subjected to boiling toluene for 1½ hours, to room temperature alcohol for 1 hour, to room temperature acetic acid for 1 hour, to room temperature 10% ammonium hydroxide for 1 hour, to room temperature ethylether for 1 hour, to boiling dichloroethylether for 2 hours, to room temperature 5% NaOH for over 50 hours, and to boiling $H_2O$ for over 16 hours without any indication of failure. The above tests are those specified by the U.S. Army for cartridge casings and are probably the most rigid any film is subjected to. In addition to having excellent chemical and water resistance, these films have good color and spread. Compositions with such outstanding characteristics have numerous commercial applications in the protective coating field. By varying the composition of the acids and isocyanates, as well as the modifiers, almost unlimited unique compositions may be obtained.

Foamed resin structures have also been prepared with the resinous aryloxy acids and isocyanate compositions modified with compounds containing active hydrogen atoms as described herein. Cellular structures possessing excellent toughness and resistance to chemicals and water, which can be varied from extreme rigidity to soft flexibility, have been prepared by simply varying the ratio of modifier to aryloxy acid. Because of their widely different properties, these foamed structures have utility in air domes, sandwiched between sheets of metal or wood for building blocks, as insulating materials, foamed cushions, etc.

These cellular structures are unique since the gaseous medium needed to foam the resinous composition is supplied internally through the liberation of the $CO_2$ formed by the reaction of the carboxyl group with the isocyanate. It is apparent, therefore, that no external foaming agent is essential. Since the resinous acids have a relatively high molecular weight (approximately 600 to 1400) the foaming action is easy to control. It should also be noted that because of the use of external heat the entire foaming operation may be completed in less than one hour. In the present commercial polyurethane foams in which water is used as the sole foaming agent, a post-curing operation of approximately 24 hours is needed. The composition and process of this invention therefore show substantial advantages over known means. It is believed that outstanding uses for the compositions of this invention will come about through the wide range of foams, possessing such a variety of characteristics which are readily available.

In general, the process for preparing the protective coating films, as described herein, comprises a simple admixing of solutions containing the aryloxy acids, the modifier, and the isocyanate. The solvent used to dissolve the acid, the modifier, and the isocyanate, when it is desirable to cut the modifier and isocyanate, must be inert to the isocyanate and acid as well as the modifier. Methyl ethyl ketone is an operable solvent. The admixture of the isocyanates and acids have been found to be stable for a period up to 144 hours. This stability characteristic is of particular importance in industrial applications where the admixture is made up and used as needed. The films are spread from these admixtures and are either air cured or cured at elevated temperatures. If the films are air cured, it is preferred that a catalyst such as triethylamine be used to accelerate the reaction. A strongly basic catalyst, such as sodium hydroxide, should be avoided since the reaction may become explosive. Films can be cured in just a few minutes at elevated temperatures as illustrated in the examples.

The manufacture of foam-resin structures, as herein described, comprises admixing an aryloxy acid with a modifier and catalyst in a suitable reaction vessel, raising the temperature to approximately 85° C. or to a temperature where the acid and modifier is molten, adding the isocyanate while stirring and allow the reaction to foam unhindered. The foamed structure may be heat converted an additional 5 to 30 minutes in a suitable draft oven in the temperature range 75–175° C. Although not essential, it is usually desirable to employ an emulsifier in order to obtain a more homogeneous mixture of the reactants. The instant process may be carried out readily in any system which provides for stirring and has sufficient space for the foaming action to proceed unhindered. A modification of a unit currently used in commercial urethane-foam production may also be employed. Such a system comprises two supply tanks connected to a pressure-mixing nozzle by suitable feed lines. One tank contains the isocyanate and the other tank, necessarily being heated to about 100° C., contains the aryloxy acid and modifier emulsified with the emulsifying agent and catalyst. The aryloxy acid and isocyanate would feed from the tanks to the nozzle where they would be mixed under pressure and said mixture flowed into pans and the foaming reaction allowed to proceed unhindered. The foams again may be cured in a suitable draft oven at elevated temperatures, thus accelerating the operation.

It has been observed that a wide range of proportions of the reactants may be used. Desirable films and foams have been obtained using about a 10–1 to a 1–8 ratio of isocyanate to acid on an equivalent basis, with marked improvement being evident when the equivalent ratio of isocyanate to acid is from about 5:1 to 1:3. It has also been observed that, while the above ratios are operable, for most practical purposes an even and near even ratio is the most desired; therefore, the preferred ratio of isocyanate to acid is from about 2:1 to 1:2 equivalents. The probable explanation why such a wide range of proportions can be used is apparently that the aryloxy acid can self-polymerize on application of heat by a condensation reaction and the diisocyanate can polymerize by an addition reaction. When modifiers are used as described herein, it has been found advantageous to replace from 5% to 65% of the acid with the modifier when expressed on an equivalent basis. The exact amount within this range being determined by the nature of the modifier and the desired final product.

In order to have a guide in the formulation of these compositions, the amine equivalents of the isocyanates used and the isocyanate equivalent of some of the aryloxy acids and modifier were determined. Equivalents as expressed above are based on the observed amine equivalent of the isocyanate and the observed or theoretical isocyanate equivalent of the acid. The analytical procedure used to determine amine equivalents of diisocyanates is found in Monsanto Chemical Company's Technical Bulletin #P-125. Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference. The bulb was immersed in the Erlenmeyer flask and crushed beneath the surface of the liquid. The solution was heated to boiling and allowed to cool one hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled $H_2O$. The average precision demonstrated by these determinations was ±1.29%.

This procedure can be modified to determine isocyanate equivalents of the resinous aryloxy acids and modifiers. The isocyanate equivalent is defined as the weight of an active hydrogen-containing compound which will react with one equivalent of the isocyanate. The method used in determining the observed values reported is that of reacting a sample of the active hydrogen compound with an excess of toluene-2,4-diisocyanate and then determining the excess isocyanate by reaction with di-n-butylamine. To 25 ml. of methyl isobutyl ketone was added three grams of toluene-2,4-diisocyanate, previously standardized against di-n-butylamine, and a weight of the active hydrogen compound such that the diisocyanate is present in approximately 100% excess. To this mixture is added 1% of the total weight of isocyanate and the active hydrogen compound, such as triethylamine. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed to the boiling point and allowed to stand for one hour at which point 75 ml. of methanol is added and the excess di-n-butylamine back-titrated with 1 N alcoholic hydrochloric acid.

In order that those skilled in the art may better understand how the present invention may be practiced, the following examples are set forth. These examples are presented by way of illustration and not by way of limitation since there are many forms of the invention other than these specifically embodied.

Examples I to VII describe the preparation of some typical resinous, phenolic aryloxy acids which are used in reaction with isocyanates to give the polyurethane-modified compositions described herein. The quantities of materials are given in parts by weight unless otherwise indicated.

EXAMPLE I

To a solution of 456 parts of p,p'-isopropylidenediphenol dissolved in 850 parts of water containing 80 parts of caustic soda was added 92.5 parts of epichlorohydrin at 70° C., and with continuous agitation the reaction mixture was raised to approximately 95° C. holding this temperature for 1 hour after addition of the epichlorohydrin. A solution of 189 parts chloroacetic acid and 160 parts of caustic soda dissolved in 800 parts of water was added and the mixture held at 100° C. for 1 hour, at which time 476 parts of 37% hydrochloric acid and 500 parts of water were added and the mixture stirred for an additional hour. The aqueous layer was decanted and the product washed three times by stirring one-half hour with 200 parts of hot water, removing the water each time by decantation. The resin was dried by heating to 130° C., giving 565 parts of a product having a softening point of 77° C.

Softening points as used throughout this disclosure were run by Durrans' mercury method (Journal of Oil and Color Chemists' Association, 12, 173–5 [1929]). Acid values are defined as the number of milligrams of potassium hydroxide which is equivalent to the acid content of one gram of the sample.

EXAMPLE II

To a solution of 456 parts of p,p'-isopropylidenediphenol dissolved in 360 parts of water containing 80 parts caustic soda was added 92.5 parts of epichlorohydrin at 60° C., and with continuous agitation the reaction temperature was raised to 95–100° C. and held for 1 hour after all of the epichlorohydrin had been added. To the reaction mixture was added 500 parts of boiling water, the mixture stirred for about 10 minutes, and the water layer removed by decantation. This water washing was repeated twice, saving the washings which were later neutralized with acid to precipitate unreacted p,p'-isopropylidenediphenol. After adding 500 parts of hot water and adjusting the temperature to 90° C., 189 parts of chloroacetic acid dissolved in 300 parts of water containing 80 parts of caustic soda were added. The temperature was raised to 80° C., and additional caustic solution of 80 parts of caustic soda in 150 parts water was added. The reaction mixture was heated to 95–100° C. and held for 1 hour, after which the aqueous layer was removed by decantation. To the agitated resinous product was added 1,000 parts of hot water and 120 parts of 37% hydrochloric acid, after which the stirring was continued at 95° C. for 45 minutes. The aqueous layer was then removed by decantation, and the resin washed three times using 2,000 parts hot water for each wash. The resin was finally dried by heating with continued agitation to 130° C. to give 841 parts of a product having a softening point of 87° C., an acid value of 57, an alcoholic hydroxyl value of 110, and a phenolic hydroxyl value of 103.

EXAMPLE III

In a caustic solution containing 53 parts caustic soda and 402 parts water was dissolved 297 parts of p,p'-isopropylidenediphenol. To this agitated mixture was added 49 parts of epichlorohydrin at 70° C., and the reaction mixture raised to approximately 95° C., holding this temperature for 45 minutes after the addition of epichlorohydrin. A solution of 90 parts chloroacetic acid and 38 parts caustic soda in 288 parts water was added and the mixture held at 95° C. for 45 minutes. To the reaction mixture was added 18 parts epichlorohydrin, and the reaction mixture was held at 95° C. for an additional 45 minutes at which time 104 parts 93% sulfuric acid which had been diluted with 292 parts water was added and stirring was continued for 45 minutes at 95° C., after which the aqueous layer was removed by decantation. The product was washed three times with hot water and dried by heating to 130° C. This resin had a softening point of 78° C., an acid value of 100, an alcoholic hydroxyl value of 97, and a phenolic hydroxy value of 78.

EXAMPLE IV

To 456 parts of p,p'-isopropylidenediphenol dissolved in 800 parts of water containing 80 parts of sodium hydroxide was added with continuous agitation a mixture containing 75 parts of 1,4-dichlorobutene-2, and 25 parts 1,2-dichlorobutene-2 at 56° C. The reaction mixture was raised to approximately 95° C. and held at this temperature for 1½ hours. With continuous agitation was added 232 parts of sodium chloroacetate in 600 parts of water and 100 parts of sodium hydroxide in 250 parts of water. With continuous agitation, heating was continued for 1 hour at 95° C. At this point, an additional 38 parts of mixed dichlorobutene was added and heating at 95° C. continued for an additional hour. The reaction mixture was neutralized with hydrochloric acid and washed and dried as in Example I to give a resinous product having an acid value of 116.

EXAMPLE V

A portion of 1140 parts of p,p'-isopropylidenediphenol was dissolved in 1500 parts of water containing 408 parts of sodium hydroxide and 573 parts bis(beta-chloroethyl)-ether was added. The reaction mixture in a closed system was heated to 150° C. and held at this temperature for 4 hours with continuous agitation. After the mixture had cooled to 98° C., the water layer was removed by decantation and the product washed with water three times in the usual manner. This intermediate, resinous product was dried by heating to 150° C. to give 1365 parts of a hard brittle resin. To 355 parts of this resin dissolved in 600 parts of dimethyl sulfoxide was added 25 parts of sodium hydroxide in 200 parts of water. To the constantly agitated mixture, at the temperature of boiling water, was added 232 parts of sodium chloroacetate dissolved in 600 parts of water over a period of 30 minutes. The reaction mixture was heated for an additional 30 minutes at 95° C. The reaction mixture was neutralized with hydrochloric acid and washed and dried as in Example I to give a product having an acid value of 35.

EXAMPLE VI

As in Example V, a portion of 1026 parts of p,p'-isopropylidenediphenol was dissolved in 1500 parts of water containing 325 parts of sodium hydroxide and 429 parts of bis(beta-chloroethyl)ether were placed in a closed reactor provided with a mechanical agitator and a thermometer. With continuous agitation the reaction mixture was raised to 150° C. and held at this temperature for 8 hours. After the mixture had cooled to 98° C., the water layer was removed by decantation and the product washed three times with hot water. This intermediate resinous product was dried by heating to 130° C. to give 1115 parts of a hard, brittle resin having a softening point of 57° C. To 412 parts of this resin dissolved in 400 parts of water containing 40 parts of sodium hydroxide and at a temperature of 98° C. was added 116 parts of sodium chloroacetate dissolved in 300 parts of water. An additional 20 parts of sodium hydroxide dissolved in 100 parts of water were added to the reaction mixture. The reaction mixture was continuously agitated for a period of 1 hour at 95° C. The alkaline reaction mixture was then neutralized with hydrochloric acid and washed and dried to give 410 parts of a product having a softening point of 59° C. and an acid value of 49.

EXAMPLE VII

A portion of 1140 parts of p,p'-isopropylidenediphenol was dissolved in 1500 parts of water containing 205 parts of sodium hydroxide and 358 parts of bis(beta-chloroethyl)ether and the reaction mixture raised to 150° C. and held at this temperature for 6 hours (a closed pressure reactor provided with agitation was required for this preparation). After the mixture had cooled to 98° C., the water layer was removed by decantation and the product washed three times with hot water in the usual manner. This intermediate resinous product was dried by heating to 130° C. to give 1275 parts of a hard brittle resin. To 263 parts of this resin dissolved in 600 parts of water containing 40 parts of sodium hydroxide and at a temperature of 98° C. was added 116 parts of sodium chloroacetate dissolved in 500 parts of water. To this mixture was added 20 parts of sodium hydroxide in 100 parts of water. The reaction mixture was continually agitated for 1 hour at 95° C. To the mixture was added 14 parts of epichlorohydrin and the reaction continued with agitation for 1 hour at 95° C. The alkaline reaction mixture was then neutralized with hydrochloric acid and washed and dried in the usual manner to give a product having an acid value of 80.2.

A selective list of isocyanates is given in Table I below, with abbreviations used in subsequent tables. Isocyanates other than those listed are operable in this invention.

*Table I*

| Commercial Source and Trade Name | Abbreviations Used In Tables | Structure | Amine Equivalent | |
|---|---|---|---|---|
| | | | Observed | Theory |
| E. I. Du Pont de Nemours & Co., Inc. Hylene T | Hy T | Toluene 2,4-diisocyanate | 90.62 | 87.07 |
| E. I. Du Pont de Nemours & Co., Inc. Hylene M | Hy M | Methylene bis(4-phenyl isocyanate) | 139.98 | 125.12 |
| National Aniline Div. Naccoate 200 | N 200 | 3,3' Bitolylene 4,4'-diisocyanate | 132.78 | 132.13 |
| Mobay Chemical Co. Mondur HX | MO HX | OCN(CH$_2$)$_6$NCO Hexamethylene diisocyanate | 103.39 | 84.01 |
| Mobay Chemical Co. Mondur O | MO O | CH$_3$(CH$_2$)$_{17}$NCO Octadecylisocyanate | 342.32 | 295.0 |
| Mobay Chemical Co. Mondur TM | MO TM | Tritolylmethane triisocyanate | 107.78 | 123.45 |

Table II gives a selective list of modifiers with abbreviations used in subsequent tables as well as pertinent information.

of 40–60%. The isocyanates and modifiers were used in most preparations at 100% nonvolatile content. In some instances, small amounts of methyl ethyl ketone

*Table II*

| Compound | Abbrev. Used In Tables | Isocyanate Equivalent | |
|---|---|---|---|
| | | Observed | Theory |
| Ethylene glycol | EG | 27.64 | 31.03 |
| 1,4-Butanediol | Budiol | 39.26 | 45.06 |
| Diethylene glycol | DEG | 44.76 | 51.16 |
| Polyethylene glycol 400: Carbide & Carbon Chemicals Co., described as having M.W. 380–420; viscosity 7.3 centistokes at 210° F. | PG400 | 163.48 | 190–210 |
| Polyethylene glycol 1000: Carbide & Carbon Chemicals Co., M.W. 950–1050; viscosity 17.4 centistokes at 210° F. | PGI | 409.76 | 500 |
| Polyethylene glycol 4000: Carbide & Carbon Chemicals Co., M.W. 3,000–3,700; viscosity 75–78 centistokes at 210° F. | PGIV | 1651.9 | 1,500–1,850 |
| Polyethylene glycol 6000: Carbide & Carbon Chemicals Co., M.W. 6,000–7,500; viscosity 700–900 centistokes at 210° F. | PGVI | 3475.6 | 3,000–3,750 |
| Glycerol (C.P. grade) | G | 29.53 | 30.67 |
| Pentaerythritol | PE | 24.24 | 34.04 |
| Epon 864: [1] Shell Chemical Corp. An epoxy resin prepared from the condensation of epichlorohydrin with bis(4-hydroxyphenyl)-dimethyl methane in the presence of alkali having a melting point (Durrans' Mercury Method, Journal of Oil & Colour Chemists' Assoc. 12, 173–175 [1929] of 40–45° C.); epoxide equivalent 300–375. | Epon 864 | 311.63 | |
| Epon 1007: [1] Shell Chemical Corp. An epoxy resin prepared from the condensation of epichlorohydrin with bis(4-hydroxyphenyl)-dimethyl methane in the presence of alkali having a melting point (Durrans' Mercury Method) of 127–133° C. epoxide equivalent 1,550–2,000. | Epon 1007 | 360.29 | |
| Resorcinol | R | 105.38 | 55.05 |
| Hydroquinone, C.P. | HQ | 161.44 | 55.05 |
| *Polybasic Acids* | | | |
| Azelaic acid | Az | 87.53 | 94.11 |
| Adipic acid | AA | 71.35 | 73.07 |
| Aconitic acid | AcA | 57.23 | 58.03 |
| Fumaric acid | FA | 52.36 | 58.03 |
| Diglycolic acid | DGA | 166.02 | 67.04 |
| Isophthalic acid | IA | 485.29 | 83.06 |
| *Amines and Amides* | | | |
| Hexamethylenediamine | Hexa | 31.96 | 29.05 |
| Diethylenetriamine | DET | 17.99 | 20.63 |
| Diethanolamine | DEA | 41.2 | 35.05 |
| Adipamide | AdA | 106.22 | 38.04 |
| Phthalamide | PA | 140.36 | 41.04 |
| Malonamide | MA | 63.65 | 25.52 |
| p-Toluenesulfonamide | TSA | 98.63 | 85.60 |
| *Sulfur-Containing Compounds* | | | |
| Thiomalic acid | TA | 58.20 | 50.03 |
| Thioglycolic acid | TGA | 35.42 | 46.05 |
| Thiourea | TU | 15.34 | 19.03 |
| 2-Mercaptoethanol | 2ME | | 39.06 |
| Thiokol Liquid Polymer LP-3: (Thiokol Chemical Corp.) Described as having formula HS—($C_2H_4O$—$CH_2$—O—$C_2H_4S$—S)$_6$—$C_2H_4$—O—$CH_2$—O—$C_2H_4$—SH, having viscosity at 25° C. of 700–1,200 centipoises | LP3 | 773.03 | |
| Thiokol Liquid Polymer LP-8: (Thiokol Chemical Corp.) Described as having formula HS($CH_2CH_2$—O—$CH_2$—O—$CH_2CH_2SS$)3-4—$CH_2CH_2$—O—$CH_2$—O—$CH_2CH_2SH$, having viscosity at 27° C. of 250–350 centipoises | LP8 | 380.68 | |
| Thiokol Liquid Polymer LP-33: (Thiokol Chemical Corp.) Described as having formula HS($C_2H_4$—O—$CH_2$—O—$C_2H_4S$—S)$_6$—$C_2H_4$—O—$CH_2$—O—$C_2H_4$—SH, having viscosity at 25° C. at 1,300–1,550 centipoises | LP33 | 597.66 | |
| *Polyester Resin Modifiers* | | | |
| Polyester Resin: [2] A succinic anhydride, azelaic acid, ethylene glycol and glycerol polyester | $X_1$ | 246.1 | |
| Polyester resin: [3] A glycerol, azelaic acid and succinic anhydride polyester | $X_2$ | 107.4 | |
| Polyester resin: [4] A diethylene glycol, glycerol and adipic acid polyester | $X_3$ | 929.0 | |

[1] Preparation of these epoxide materials as well as illustrative examples are described in U.S. Patents 2,456,408, 2,503,726, 2,615,007, 2,615,008, 2,688,805, 2,668,807, and 2,698,315.

[2] In a 3-neck flask provided with a thermometer, a condenser attached through a water trap, and a mechanical stirrer was placed 502 parts succinic anhydride, 943 parts azelaic acid, and 414 parts ethylene glycol. The reaction mixture was gradually heated to 204° C. with continuous agitation at which point a sufficient amount of xylene was added to give constant refluxing at 195–204° C. After refluxing for 2 hours at 195–204° C., 462 parts of glycerol was added dropwise over a period of 1 hour and 10 minutes. Refluxing was continued for 2 hours and 15 minutes at 204–220° C. at which point most of the xylene was removed by distillation. The viscous syrupy product had a nonvolatile content of 96.5% and an acid value of 6.

[3] As in the preparation of polyester resin $X_1$, 925 parts of glycerol, 785 parts azelaic acid, and 418 parts of succinic anhydride were refluxed with xylene at 184–204° C. for 3½ hours. Most of the xylene was removed by distillation at 200–205° C. The viscous syrupy product had a nonvolatile content of 95% and acid value of 7.6.

[4] As in the preparation of polyester resin $X_1$, 212 parts of diethylene glycol, 292 parts of adipic acid, and 2 parts of glycerol were refluxed with xylene at 200–225° C. for 6 hours. The xylene was removed by heating at 220–225° C. with reduced pressure of around 70–80 mm. The viscous syrupy product had an acid value of 12.8.

Examples VIII through LXXVIII illustrate the preparation of insoluble and infusible protective coating films from the compositions of this invention. In the preparation of the composition for heat curing to form protective coating films, each of the resinous aryloxy acids were dissolved in methyl ethyl ketone to a nonvolatile content were used for solubility purposes. Mixtures of the resinous, aryloxy-acid solutions with the isocyanates and modifiers were found to be stable for periods up to 144 hours. Mixtures of the solutions were spread on panels with a .002" Bird applicator and the films were baked for periods of 10-60 minutes at temperatures ranging from 125-175° C. Proportions hereinafter expressed refer to parts by weight and are based on the nonvolatile content of the solutions of the reactants.

COMPOUNDS MODIFIED WITH HYDROXY COMPOUNDS

| Example No. | Aryloxy Acid | Parts | Isocyanate | Parts | Modifier | Parts | Conversion | | Film Resistance (Hours) | |
|---|---|---|---|---|---|---|---|---|---|---|
| | | | | | | | Time (Hrs.) | Temp., °C. | $H_2O$ at 100° C. | 5% Aqueous NaOH at 25° C. |
| VIII | Ex. III | 21 | MO HX | 21 | EG | 2.7 | .50 | 150 | [3] 16 | [3] 50 |
| IX | Ex. I | 21 | HY T | 18 | PGI | 10.0 | .50 | 150 | [3] 16 | [3] 50 |
| X | Ex. II | 21 | HY M | 28 | PGIV | 10.0 | .50 | 150 | [3] 16 | [3] 50 |
| XI | Ex. II | 21 | N 200 | 27 | G | 4.0 | .50 | 150 | [3] 16 | 26 |
| XII | Ex. VII | 15 | MO HX | 21 | Budiol | 4.5 | .50 | 150 | [3] 16 | [3] 50 |
| XIII | Ex. VII | 29 | HY T | 18 | EG | 2.7 | .50 | 150 | [3] 16 | 5.5 |
| XIV | Ex. VII | 29 | N 200 | 27 | Epon 864 | 31.0 | .50 | 150 | [3] 16 | [3] 50 |
| XV | Ex. VII | 29 | HY M | 28 | DEG | 5.1 | .50 | 150 | [3] 16 | [3] 50 |
| XVI | Ex. VI | 44 | HY T | 27 | Epon 1007 | 36.0 | .50 | 150 | [3] 16 | [3] 50 |
| XVII | Ex. VI | 44 | HY M | 28 | R | 5.0 | .50 | 150 | [3] 16 | .16 |
| XVIII | Ex. VI | 44 | N 200 | 27 | PG 400 | 10.0 | .50 | 150 | [3] 16 | [3] 50 |
| XIX | Ex. I | 19 | HY T | 18 | DEG | 5.3 | .33 | 125 | 1.5 | [3] 50 |
| XX | Ex. II | 15 | HY T | 18 | DEG | 5.3 | .33 | 125 | 16 | [3] 50 |
| XXI | Ex. IV | 31 | HY T | 18 | Budiol | 4.5 | .50 | 150 | 1 | 1.5 |
| XXII | Ex. IV | 31 | HY M | 35 | HQ | 5.0 | .50 | 150 | [3] 16 | .16 |

COMPOUNDS MODIFIED WITH POLYBASIC ACIDS

| Example No. | Aryloxy Acid | Parts | Isocyanate | Parts | Modifier | Parts | Time (Hrs.) | Temp., °C. | $H_2O$ at 100° C. | 5% Aqueous NaOH at 25° C. |
|---|---|---|---|---|---|---|---|---|---|---|
| XXIII | Ex. III | 21 | HY M | 14 | AZ | 9.0 | .50 | 175 | [3] 16 | [3] 50 |
| XXIV | Ex. III | 21 | MO HX | 21 | IA | 2.1 | .33 | 175 | [3] 16 | [3] 50 |
| XXV | Ex. IV | 31 | HY M | 28 | AA | 7.0 | .50 | 175 | [3] 16 | [3] 50 |
| XXVI | Ex. VII | 29 | HY M | 28 | AcA | 2.7 | .50 | 175 | [3] 16 | [3] 50 |
| XXVII | Ex. VII | 29 | HY T | 18 | AA | 3.5 | .50 | 175 | [3] 16 | [3] 50 |
| XXVIII | Ex. VII | 29 | MO HX | 21 | FA | 2.6 | .50 | 175 | [3] 16 | [3] 50 |
| XXIX | Ex. VII | 29 | N 200 | 27 | DGA | 3.3 | .50 | 150 | 8 | .5 |
| XXX | Ex. VI | 44 | HY M | 28 | FA | 2.6 | .50 | 175 | [3] 16 | [3] 50 |
| XXXI | Ex. VI | 44 | N 200 | 27 | AZ | 4.5 | .50 | 175 | 8 | [3] 50 |
| XXXII | Ex. V | 74 | HY M | 21 | IA | 5.0 | .50 | 175 | [3] 16 | [3] 50 |
| XXXIII | Ex. V | 74 | HY T | 27 | FA | 5.2 | .50 | 175 | 4.5 | [3] 50 |
| XXXIV | Ex. V | 74 | N 200 | 27 | AZ | 4.5 | .50 | 175 | 8 | [3] 50 |
| XXXV | Ex. I | 21 | HY M | 14 | AZ | 9.0 | .33 | 175 | [3] 16 | [3] 50 |
| XXXVI | Ex. II | 21 | MO HX | 21 | IA | 2.1 | .33 | 175 | [3] 16 | [3] 50 |

COMPOUNDS MODIFIED WITH AMINE AND AMIDE

| Example No. | Aryloxy Acid | Parts | Isocyanate | Parts | Modifier | Parts | Time (Hrs.) | Temp., °C. | $H_2O$ at 100° C. | 5% Aqueous NaOH at 25° C. |
|---|---|---|---|---|---|---|---|---|---|---|
| XXXVII | Ex. I | 75 | HY T | 20 | MA | 5.0 | .50 | 150 | [3] 16 | [3] 50 |
| XXXVIII | Ex. II | 21 | N 200 | 27 | AdA | 7.0 | .50 | 150 | [3] 16 | [3] 50 |
| XXXIX | Ex. III | 75 | HY T | 20 | MA | 5.0 | .50 | 150 | [3] 16 | [3] 50 |
| XL | Ex. III | 21 | HY M | 28 | TSA | 4.0 | .50 | 150 | [3] 16 | [3] 50 |
| XLI | Ex. III | 21 | N 200 | 27 | AdA | 5.0 | .50 | 150 | [3] 16 | [3] 50 |
| XLII | Ex. IV | 31 | HY M | 28 | AdA | 2.0 | .50 | 150 | [3] 16 | [3] 50 |
| XLIII | Ex. VII | 29 | MO HX | 21 | HEXA | 4.0 | .50 | 150 | 8 | [3] 50 |
| XLIV | Ex. V | 74 | HY M | 28 | PA | 5.0 | .50 | 150 | [3] 16 | [3] 50 |
| XLV | Ex. IV | 15 | MO HX | 21 | AdA | 3.0 | .50 | 150 | [3] 16 | [3] 50 |
| XLVI | Ex. VI | 44 | MO HX | 21 | HEXA | 4.0 | .50 | 150 | [3] 16 | [3] 50 |
| XLVII | Ex. VI | 44 | HY T | 20 | DET | 2.0 | .50 | 150 | [3] 16 | [3] 50 |
| XLVIII | Ex. III | 21 | MO HX | 21 | DEA | 4.0 | .50 | 150 | [3] 16 | [3] 50 |
| XLIX | Ex. VI | 44 | HY M | 28 | DEA | 4.0 | .50 | 150 | [3] 16 | [3] 50 |

COMPOUNDS MODIFIED WITH SULFUR-CONTAINING COMPOUNDS

| Example No. | Aryloxy Acid | Parts | Isocyanate | Parts | Modifier | Parts | Time (Hrs.) | Temp., °C. | $H_2O$ at 100° C. | 5% Aqueous NaOH at 25° C. |
|---|---|---|---|---|---|---|---|---|---|---|
| L | Ex. I | 21 | HY T | 18 | LP 33 | 10 | .50 | 150 | [3] 16 | 20 |
| LI | Ex. II | 21 | HY M | 28 | LP 8 | 15 | .50 | 150 | [3] 16 | [3] 50 |
| LII | Ex. III | 21 | HY T | 18 | LP 33 | 10 | .50 | 150 | [3] 16 | 5.5 |
| LIII | Ex. III | 21 | HY M | 28 | LP 8 | 15 | .50 | 150 | [3] 16 | [3] 50 |
| LIV | Ex. III | 21 | N 200 | 27 | LP 3 | 16 | .50 | 150 | [3] 16 | [3] 50 |
| LV | Ex. VII | 29 | HY T | 18 | LP 3 | 12 | .75 | 150 | .33 | [3] 50 |
| LVI | Ex. VI | 44 | MO HX | 42 | TGA | 4 | .50 | 150 | 2.5 | [3] 50 |
| LVII | Ex. VI | 44 | N 200 | 27 | TU | 2 | .75 | 175 | 9 | 1.5 |
| LVIII | Ex. V | 74 | MO HX | 31 | TA | 6 | .75 | 175 | .75 | [3] 50 |
| LIX | Ex. V | 70 | HY M | 20 | LP 3 | 10 | .50 | 175 | 16 | [3] 50 |
| LX [1] | Ex. II | 21 | MO HX | 21 | 2ME | 4 | .75 | 175 | .5 | [3] 50 |

COMPOUNDS MODIFIED WITH POLYESTERS

| Example No. | Aryloxy Acid | Parts | Isocyanate | Parts | Modifier | Parts | Time (Hrs.) | Temp., °C. | $H_2O$ at 100° C. | 5% Aqueous NaOH at 25° C. |
|---|---|---|---|---|---|---|---|---|---|---|
| LXI | Ex. I | 21 | MO HX | 21 | $X_1$ | 25 | .50 | 150 | 8 | [3] 50 |
| LXII | Ex. II | 21 | HY T | 18 | $X_2$ | 11 | .50 | 150 | [3] 16 | [3] 50 |
| LXIII | Ex. III | 21 | HY M | 28 | $X_3$ | 40 | .50 | 150 | [3] 16 | [3] 50 |
| LXIV | Ex. III | 21 | N 200 | 27 | $X_2$ | 11 | .50 | 150 | [3] 16 | [3] 50 |
| LXV | Ex. III | 25 | HY T | 18 | $X_1$ | 24 | .66 | 125 | [3] 16 | [3] 50 |
| LXVI | Ex. III | 21 | HY M | 28 | $X_1$ | 24 | .12 | 175 | [3] 16 | [3] 50 |
| LXVII | Ex. IV | 31 | MO HX | 21 | $X_2$ | 11 | .50 | 150 | 8 | 32 |
| LXVIII | Ex. IV | 31 | HY T | 18 | $X_1$ | 25 | .50 | 150 | 8 | [3] 50 |
| LXIX | Ex. IV | 31 | HY M | 35 | $X_2$ | 11 | .50 | 150 | [3] 16 | [3] 50 |
| LXX | Ex. IV | 31 | N 200 | 27 | $X_1$ | 25 | .50 | 150 | 8 | [3] 50 |
| LXXI | Ex. VII | 29 | HY T | 18 | $X_2$ | 11 | .50 | 150 | 8 | [3] 50 |
| LXXII | Ex. VII | 29 | HY M | 28 | $X_1$ | 25 | .50 | 150 | [3] 16 | [3] 50 |
| LXXIII | Ex. VII | 29 | N 200 | 27 | $X_2$ | 11 | .50 | 150 | [3] 16 | [3] 50 |
| LXXIV [2] | Ex. VI | 44 | MO HX | 31 | $X_1$ | 25 | .50 | 150 | 8 | [3] 50 |
| LXXV [2] | Ex. VI | 44 | HY T | 23 | $X_2$ | 11 | .50 | 150 | 8 | [3] 50 |
| LXXVI | Ex. VI | 44 | HY M | 28 | $X_2$ | 11 | .50 | 150 | [3] 16 | [3] 50 |
| LXXVII | Ex. VI | 44 | N 200 | 27 | $X_1$ | 25 | .50 | 150 | 8 | [3] 50 |
| LXXVIII [2] | Ex. V | 80 | HY M | 15 | $X_1$ | 5 | .50 | 150 | 8 | [3] 50 |

[1] 0.4 part triethylamine catalyst was added.
[2] .26 part triethylamine catalyst was added.
[3] Tests were stopped with no indication of film failure.

Examples LXXIX through LXXXIV will illustrate the preparation of foamed resin products.

EXAMPLE LXXIX 40 parts of Example III, 20 parts of Carbowax 4000, manufactured by Carbide & Carbon Chemicals Co., a polyethylene glycol having a molecular weight between 3,000 and 3,700 and 120 parts of polyester designated $X_3$ on Table II were charged to an open container and heated by means of an oil bath to 85° C. At this time the resinous acid and modifiers were molten and easily stirred. .8 part triethylamine catalyst and 45 parts of Hylene T were added with stirring. Stirring was continued until the temperature reached 90° C. at which time all external heat was removed and product allowed to foam unhindered. A semi-rigid, light colored foam was obtained.

EXAMPLE LXXX 80 parts of Example III, 10 parts of Tween 81, manufactured by Atlas Powder Company, a polyoxyethylene sorbitan monooleate emulsifier, and 80 parts of polyester designated $X_1$ in Table II were charged to an open container and heated by means of an oil bath to 85° C., at which time the resinous acid and modifiers were molten and easily stirred. .8 part of triethylamine catalyst and 51 parts Mondur HX were added with stirring. Stirring was continued until the temperature reached 90° C. at which time the composition was put in a 100° C. draft oven for 20 minutes. The product was a hard, very tough, rigid foam.

EXAMPLE LXXXI 40 parts Example I, 10 parts of Tween 81, and 120 parts of polyester designated $X_1$ in Table II were charged to an open container and the foaming operation carried out as in Example LXXX using 75 parts Mondur HX. The foamed product was flexible with a fairly large cell size.

EXAMPLE LXXXII 40 parts of Example III, 5 parts of Tween 81, 60 parts of polyester designated $X_1$ in Table II, .6 part triethylamine catalyst, and 10 parts Carbowax 6000, manufactured by Carbide & Carbon Chemicals Co., a polyethylene glycol with molecular weight between 6,000 and 7,500, were charged to an open container and foaming operation carried out as in Example LXXX using 20 parts of Mondur HX. Product was light in color and weight, very flexible, with a soft, uniform texture.

EXAMPLE LXXXIII 50 parts of Example III, 5 parts of Tween 81, 13 parts of Carbowax 6000, .6 part of triethylamine catalyst, and 50 parts of polyester designated $X_1$ in Table II were charged to an open container and the foaming operation carried out as in Example LXXX using 20 parts Mondur HX. Foamed product was light in color, fairly dense but easily compressed, and recovered its form quite rapidly.

EXAMPLE LXXXIV 60 parts of Example III, 5 parts of Tween 81, 10 parts of Carbowax 6000, 16 parts triethylamine catalyst, and 40 parts of polyester designated $X_1$ in Table II were charged to an open container and foaming operation carried out as in Example LXXX using 20 parts Mondur HX. The foamed product was light in color and weight, could be compressed, recovered fairly fast, but was much more rigid than Example LXXXIII.

If it is desired, water can be used to enhance the foaming action of these compositions and to permit further variation in their properties. Desirable amounts range up to about 15% based on the total weight of the composition.

EXAMPLE LXXXV 40 parts of Example III, 120 parts of polyester designated $X_1$ in Table II were charged to an open container and by means of an oil bath heated to 85° C. At this time the resinous acid was molten and easily stirred. 10 parts of Tween 81, 10 parts water, and .1 part of triethylamine catalyst were added with thorough mixing. 75 parts hexamethylene diisocyanate were then added with stirring. Stirring was continued until a temperature of 90° C. was reached; at which time the composition was put in a 100° C. draft oven for 10 minutes. The product was a dense, fairly flexible foam.

It should be appreciated that while there are above disclosed but a limited number of embodiments of this invention, it is possible to produce still other embodiments without departing from the inventive concept herein disclosed. The unmodified aryloxy acid-isocyanate compositions are disclosed in the Breiner copending application entitled Aryloxy Acid Urethane.

It is claimed and desired to secure by Letters Patent:

1. A new composition of matter comprising the reaction product of (A) a compound having the general formula $R(NCX)_z$, wherein R is an organic radical, X is a chalcogen having an atomic weight less than 33, and z is an integer representing a value of more than 1, (B) a phenoxy monocarboxylic acid of the general formula

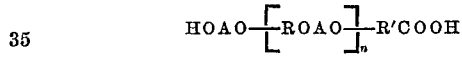

wherein A is an arylene radical, R is a divalent aliphatic radical of 2 to 8 carbon atoms, R' is an aliphatic hydrocarbon radical of 1 to 7 carbon atoms, and $n$ has a value of 1 to 6, and (C) an organic compound containing at least 2 active hydrogen atoms, each of said active hydrogen atoms being present in a compound selected from the group consisting of polyesters, polyhydric alcohols, polyhydric phenols, polyamines, diamides, dicarboxylic acids, water, mixtures thereof, and any of the above compounds in which at least one oxygen atom has been replaced by sulphur, and wherein A and B+C are present on an equivalent ratio of from about 5:1 to 1:3 with C constituting from 5 to 65% of B+C.

2. A composition of matter as described in claim 1, wherein the active hydrogen-containing compound is a polyester of a polycarboxylic acid and a polyhydric alcohol.

3. A composition of matter as described in claim 1, wherein the phenoxy monocarboxylic acid has the structure

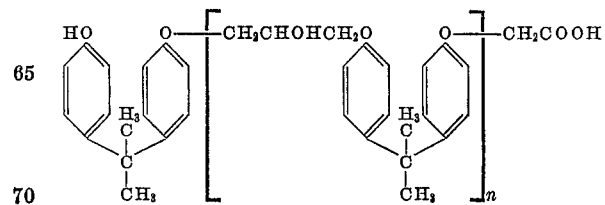

and $n$ has a value of 1 to 5.

4. A composition of matter as described in claim 1, wherein the phenoxy monocarboxylic acid has the structure

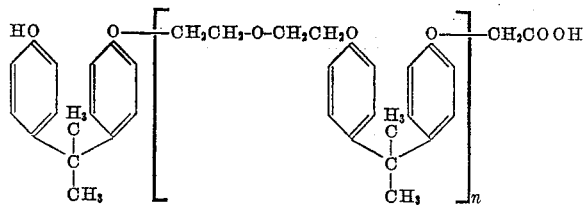

and $n$ has a value of 1 to 5.

5. A composition of matter as described in claim 1, wherein the polyisocyanate is an aliphatic polyisocyanate.

6. A composition of matter as described in claim 1, wherein the polyisocyanate is an aromatic polyisocyanate.

References Cited in the file of this patent

UNITED STATES PATENTS

| | | |
|---|---|---|
| 2,729,618 | Muller et al. | Jan. 3, 1956 |
| 2,764,566 | Simon et al. | Sept. 25, 1956 |